Dec. 22, 1936.                J. H. SAARINEN                2,065,246
                                TROLLING SPOON
                              Filed Jan. 20, 1936

Inventor
John H. Saarinen

By Geo. P. Kimmel
    Attorney

Patented Dec. 22, 1936

2,065,246

UNITED STATES PATENT OFFICE 2,065,246

TROLLING SPOON

John H. Saarinen, Astoria, Oreg.

Application January 20, 1936, Serial No. 59,985

6 Claims. (Cl. 43—45)

This invention relates to a trolling spoon, and has for its object to provide, in a manner as hereinafter set forth a spoon of the class referred to formed substantially throughout its lengthwise center with a substantially endless reinforcing means therefor to reduce the bending thereof to a minimum.

A further object of the invention is to provide, in a manner as hereinafter set forth, a spoon of the class referred to whereby, when used the reflections therefrom are small, short and quick and imitate as close as possible the reflections caused by the scales of a bait fish which have a tendency to attract the fish sought to be caught.

A further object of the invention is to provide, in a manner as hereinafter set forth, a trolling spoon so formed with offset surfaces for materially reducing reflections of the light and sun resulting in less tendency to scare fish when the spoon is used.

A further object of the invention is to provide, in a manner as hereinafter set forth, a trolling spoon so formed for interrupting the plane surfaces thereof as much as possible in keeping with the fish attracting efficiency of the spoon.

Further objects of the invention are to provide, in a manner as hereinafter set forth, a trolling spoon which is simple in its construction and arrangement, strong, durable, compact, thoroughly efficient in its use, and inexpensive to manufacture.

With the foregoing and other objects which may hereinafter appear, the invention consists of such parts and such combination of parts as will be more specifically described and are as illustrated in the accompanying drawing wherein is shown an embodiment of the invention, but it is to be understood that changes, variations and modifications may be resorted to which fall within the scope of the invention as claimed.

In the drawing:

Figure 1 is a top plan view of the spoon,

Figure 2 is a section on line 2—2 Figure 1, and

Figures 3, 4, 5, 6, and 7 are respectively transverse sectional views, upon an enlarged scale on lines 3—3, 4—4, 5—5, 6—6, and 7—7 Figure 1.

The spoon comprises a metallic plate or body 1 of the desired length and thickness and may be formed from any suitable highly polished or plated metallic material. The plate 1 is of ovoidal contour in plan and of ogee curvature in lengthwise section. The follower end portion of the plate is of greater width than the leading end portion thereof. The leading and follower end edges 3, 2 respectively of the plate are arranged upon oppositely disposed curves and with the edge 2 being upon a greater arc than the edge 3.

The plate 1 has spaced lengthwise portions of its upper face depressed to form a pair of oppositely disposed grooves 4, 5 of like form. The grooves are arranged in spaced relation with respect to the longitudinal median and the side edges 6 of plate 1. Each of said grooves gradually increases in depth from each end to its transverse center. The grooves 4, 5 are of segmented contour and each extends from a point forwardly of to a point rearwardly of the transverse median of plate 1. The depressed portions of the plate 1 which provide the grooves 4, 5 form the lower face of the plate 1 with a pair of spaced oppositely disposed ridges 7 of segmental contour. The depressed portions of the plate 1, which provide the grooves 4, 5 further form the upper face, centrally thereof with a ridge 8 formed of a pair of oppositely disposed flared stretches 9, 10. The depressed portions of the plate 1 which provide the grooves 4, 5 and ridges 7, 8 form the lower face of the plate 1, at its lengthwise center with a groove 10 of a contour corresponding to that of ridge 8. At the follower end of the ridge 8 the upper face of plate 1 is provided with a depressed portion 11 forming a recess 12. The top of ridge 8 intermediate its ends is provided with an upset part 13 which forms the lower face of the plate 1 with a recess 14. The recesses 12, 14 are intersected by the longitudinal median of the plate.

The upper face of the follower end portion of the plate 1 is provided with a series of depressed portions 15 disposed radially with respect to the recess 12 and which form the upper face of plate 1 with a series of spaced grooves 16 and spaced ridges indicated at 17, 18, and 19. The grooves 16 are alternately disposed with respect to the said ridges 17, 18, and 19. The depressed portions 15 form the lower face of the plate 1 with spaced grooves 20 and spaced ridges 21 which are alternately disposed with respect to the grooves 20. The upper and lower faces of plate 1 are indicated at 25, 26 respectively.

The upper face of the leading end portion of the plate 1 is formed with upstanding portions 28, 29, 30 and depressed portions 31, 32. The portion 31 is arranged between the portions 28, 29, and the portion 32 between the portions 29 and 30. The portions 28, 29 and 30 provide the upper face of the plate 1 with ridges 33, 34 and 35. The depressed portions 31, 32 form the upper face of the plate 1 with grooves 36 and 37. The upstanding portions 28, 29, and 30 form the lower face of the plate 1 with grooves 38, 39 and 40. The groove 36 is arranged between the ridges 33, 34. The groove 37 is arranged between the ridges 34 and 35. The ridge 31 is arranged between the grooves 39, 40. The ridge 33, groove 36, groove 37 and ridge 35 are radially disposed with respect to the leading end of the ridge 8. The ridges 31, 32 and grooves 39 and 40 are disposed in the same manner as the ridge 33, groove 36, groove 37 and ridge 35 respectively.

The ridge 18 is arranged in endwise alignment with respect to the follower end of ridge 8. The ridge 34 is disposed in endwise alignment with respect to the leading end of the ridge 8. The ridges 8, 18, and 34 are intersected lengthwise by the longitudinal median of the plate 1. The ridges 8, 18, and 34 form a substantially endless reinforcing means substantially throughout the longitudinal center of plate 1 whereby the strength of the latter is increased to prevent the bending thereof transversely.

The plate 1 in proximity to its follower edge 2 is formed with an opening 41 for the passage of a loop 42 for connecting a hook 43 to the spoon. The plate 1 in proximity to its leading edge 3 is formed with an opening 44 for the passage of a loop 45 for connecting to the spoon a coupling strength of the latter is increased to prevent the shown.

The portions of the plate 1 which provide the recesses 12, 14 are for the purpose of interrupting the plane surface of plate 1 as much as possible in keeping with the fish attracting efficiency of the spoon.

The ridges at the leading end portion of the plate are oppositely disposed with respect to the ridges at the follower end portion of the plate.

The plate 1 is constructed in a manner as referred to for eliminating to a minimum straight surfaces. Straight surfaces cause the plate to act much like a mirror, and it is obvious that when a spoon having a large amount of straight surfaces is operated in clear water, that the reflections of the light or sun are very large and in some instances several square feet in area, which has a tendency to scare the fish away, more especially when a large area of water is suddenly flooded with light caused by the reflection. By reducing straight surfaces to a minimum, as is provided by a spoon made in accordance with this invention, it overcomes the objections heretofore pointed out as the reflections caused by the spoon are small, short and with the reflections such which will imitate as close as possible the reflections caused by the scales of a bait fish. This small, quick and short reflection has a tendency to attract the fish sought to be caught.

What I claim is:

1. In a trolling spoon, a plate of substantially ovoidal contour, said plate being provided on one of its faces between its longitudinal median and its side edges with a pair of oppositely disposed segmental ridges lengthwise thereof and on its other face between said median and side edges with a pair of oppositely disposed segmental grooves lengthwise thereof, said plate being formed on the said other face between said grooves with a central ridge lengthwise thereof, said plate being formed on the said other face with a set of radially disposed ridges at its follower end portion and on the said other face with a set of radially disposed ridges at its leading end portion and said plate being formed with a pair of recesses one of which being located at one end of said central ridge and opening at the first mentioned face of the plate and the other of which being arranged in and intermediate the ends of said central ridge.

2. The invention as set forth in claim 1 having said central ridge formed with a pair of oppositely flared terminal portions, and the number of the ridges in the follower end portion of the plate being greater than the number of ridges in the leading end portion of the plate.

3. In a trolling spoon a plate of substantially ovoidal contour in plan and of substantial o-gee curvature in longitudinal section, said plate being formed on one face between its longitudinal median and its side edges with a pair of spaced oppositely disposed segmental-shaped ridges and on its other face with a pair of oppositely disposed spaced segmental-shaped grooves, said plate being formed on one face with a central groove arranged between said pair of ridges and on its other face with a central ridge positioned between said pair of grooves, said ridges and grooves extending lengthwise of and having their ends spaced from the ends of said plate.

4. In a trolling spoon a plate of substantially ovoidal contour in plan and of substantially o-gee curvature in longitudinal section, said plate being formed on one face between its longitudinal median and its side edges with a pair of spaced oppositely disposed segmental-shaped ridges and on its other face with a pair of oppositely disposed spaced segmental-shaped grooves, said plate being formed on one face with a central groove arranged between said pair of ridges and on its other face with a central ridge positioned between said pair of grooves, said ridges and grooves extending lengthwise of and having their ends spaced from the ends of said plate, said central ridge and central groove being oppositely flared.

5. In a trolling spoon, a plate of substantially ovoidal contour in plan and of substantially o-gee curvature in longitudinal section, said plate being formed on one face between its longitudinal median and its side edges with a pair of spaced oppositely disposed segmental-shaped ridges and on its other face with a pair of oppositely disposed spaced segmental-shaped grooves, said plate being formed on one face with a central groove arranged between said pair of ridges and on its other face with a central ridge positioned between said pair of grooves, said ridges and grooves extending lengthwise of and having their ends spaced from the ends of said plate, said central ridge and central groove being oppositely flared, said central ridge in its top and intermediate its ends being formed with a recess, and said plate being formed with a recess at one end of said central groove.

6. In a trolling spoon, a plate of substantially ovoidal contour in plan and of substantially o-gee curvature in longitudinal section, said plate being formed on one face between its longitudinal median and its side edges with a pair of spaced oppositely disposed segmental-shaped ridges and on its other face with a pair of oppositely disposed spaced segmental-shaped grooves, said plate being formed on one face with a central groove arranged between said pair of ridges and on its other face with a central ridge positioned between said pair of grooves, said ridges and grooves extending lengthwise of and having their ends spaced from the ends of said plate, said central ridge and central groove being oppositely flared, and said plate being formed with a pair of oppositely disposed sets of ridges extending radially from the ends of said central ridge and a pair of oppositely disposed sets of grooves extending radially from the ends of said central groove.

JOHN H. SAARINEN.